June 17, 1947.   R. T. ADAMS   2,422,282
ARTICLE FORMING APPARATUS
Filed Jan. 11, 1945   11 Sheets-Sheet 9
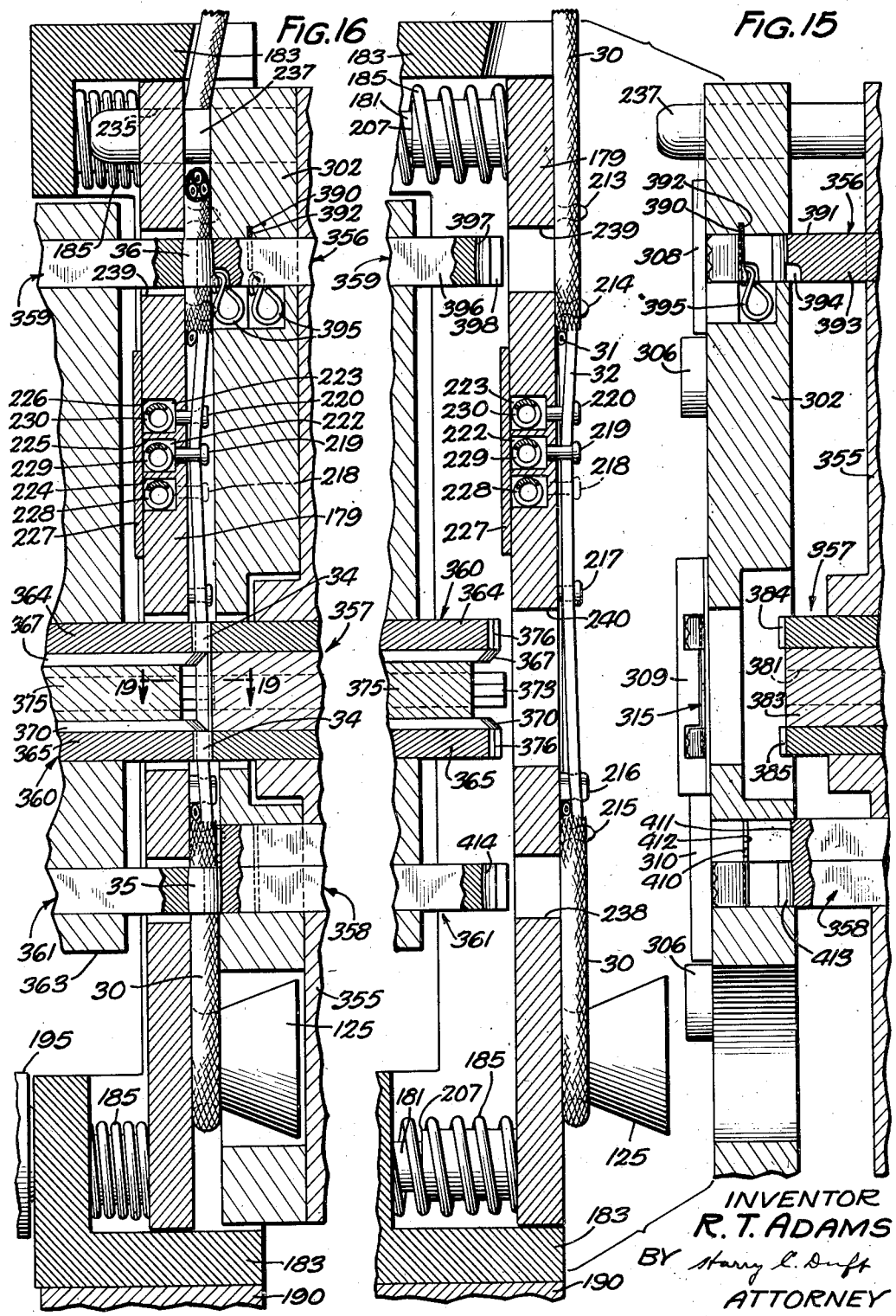
INVENTOR
R. T. ADAMS
BY Harry L. Duft
ATTORNEY

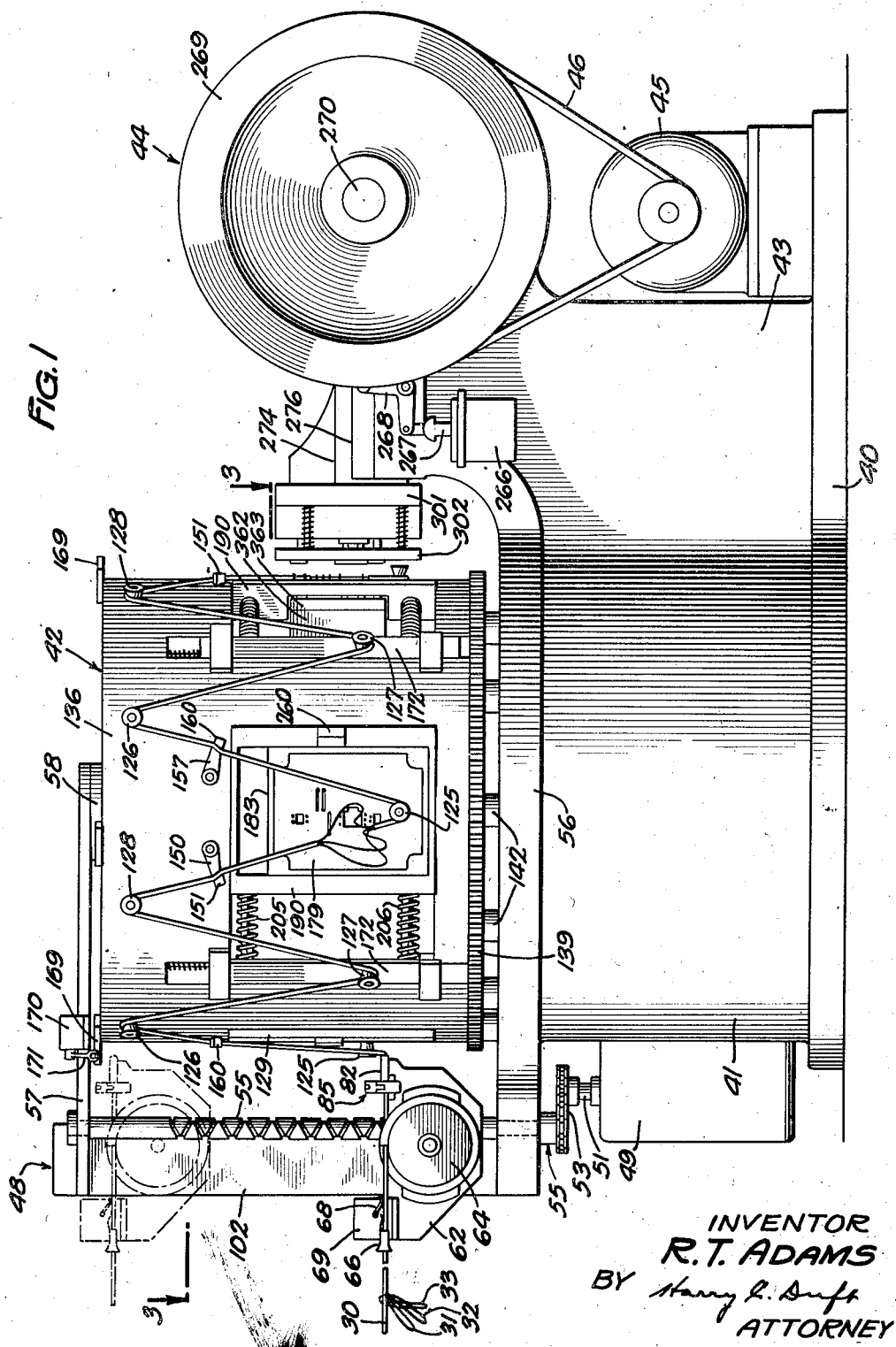

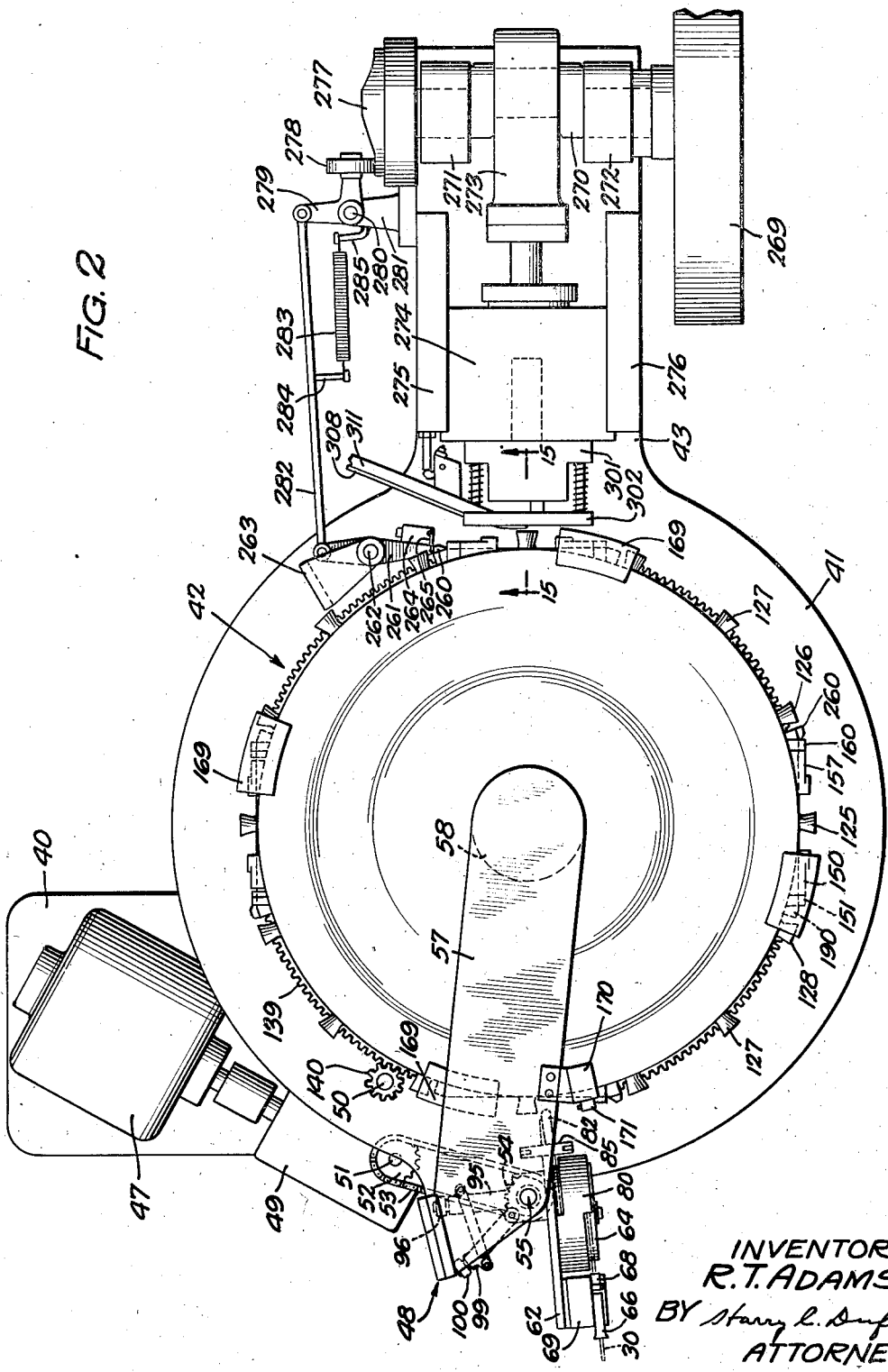

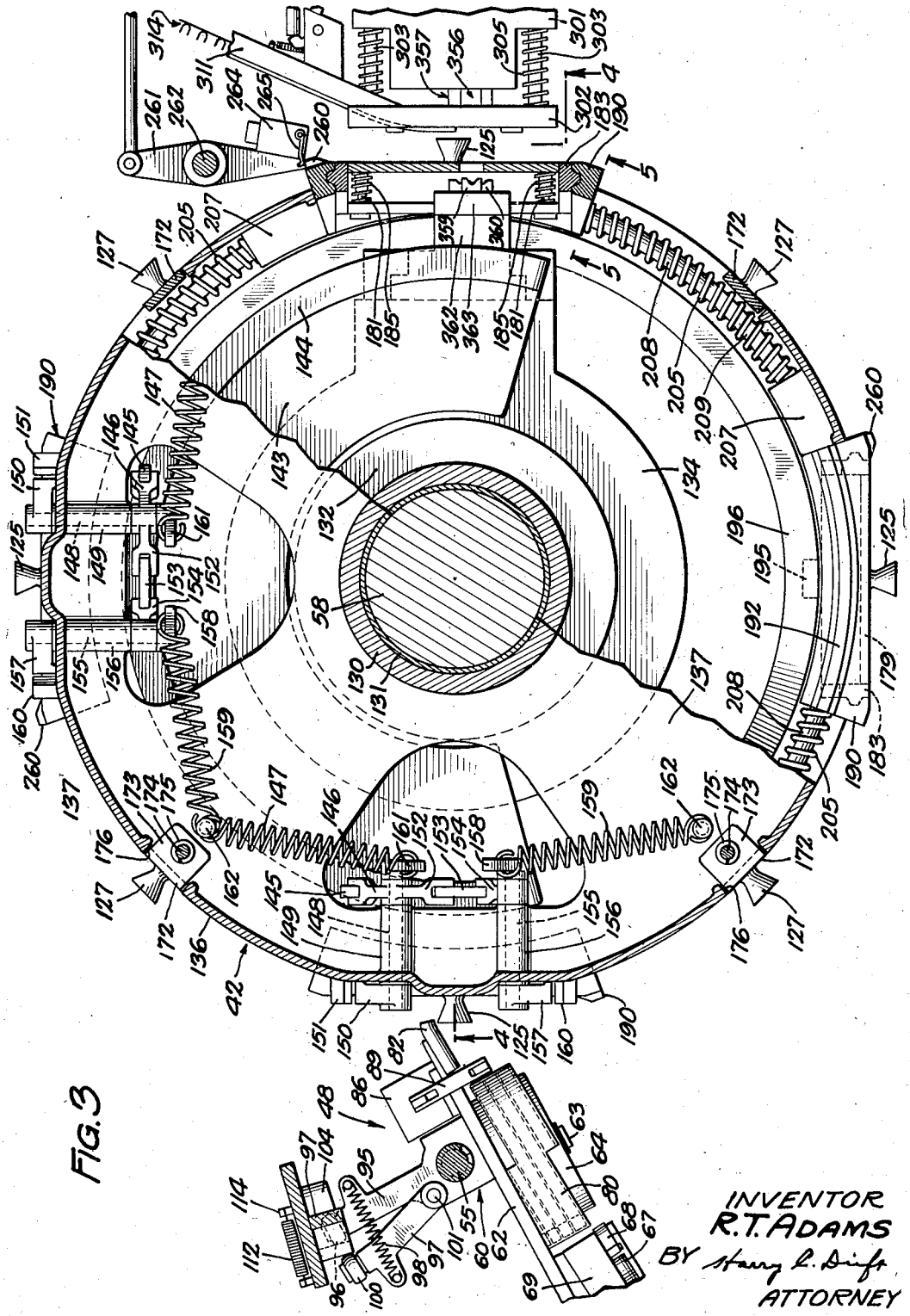

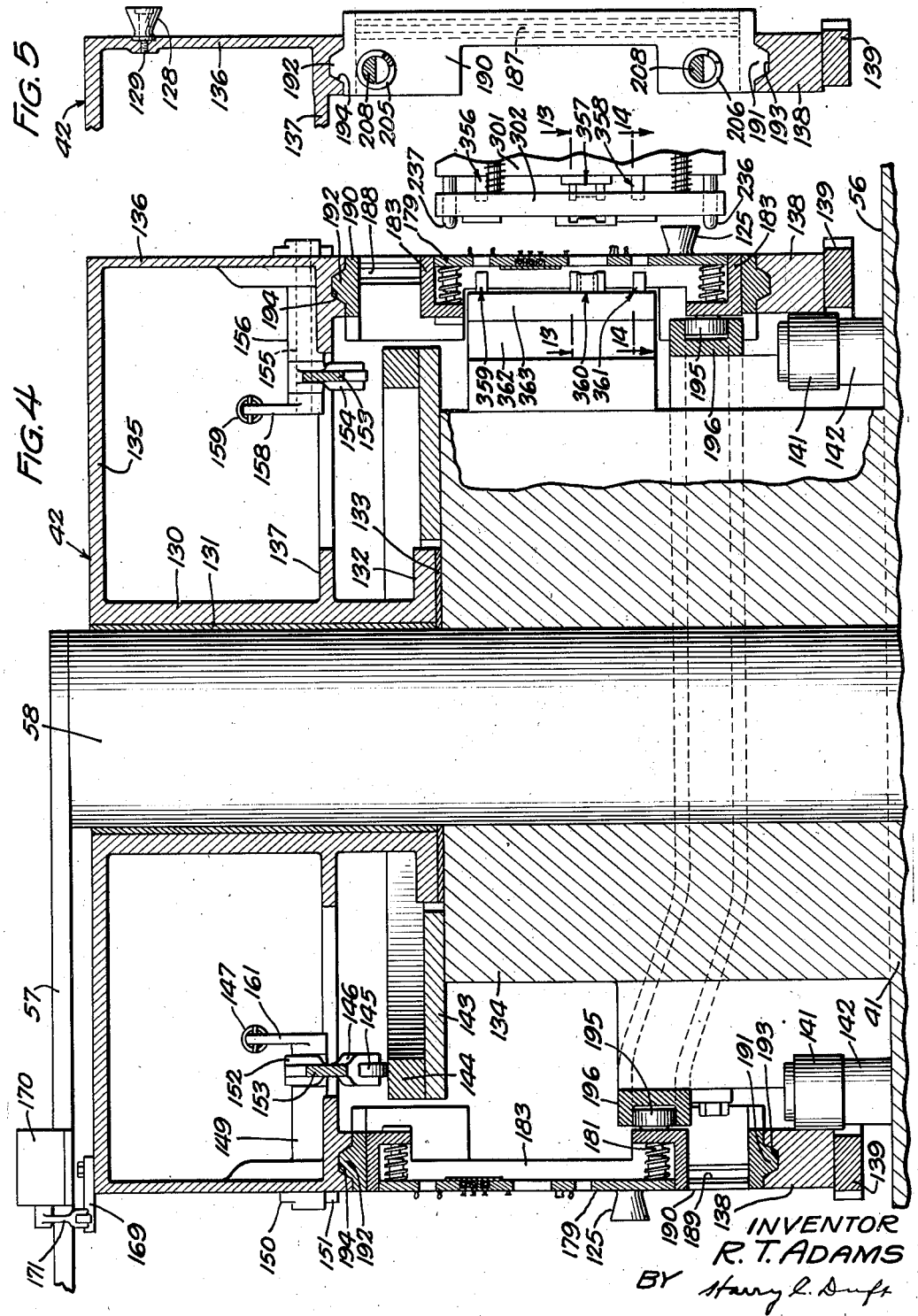

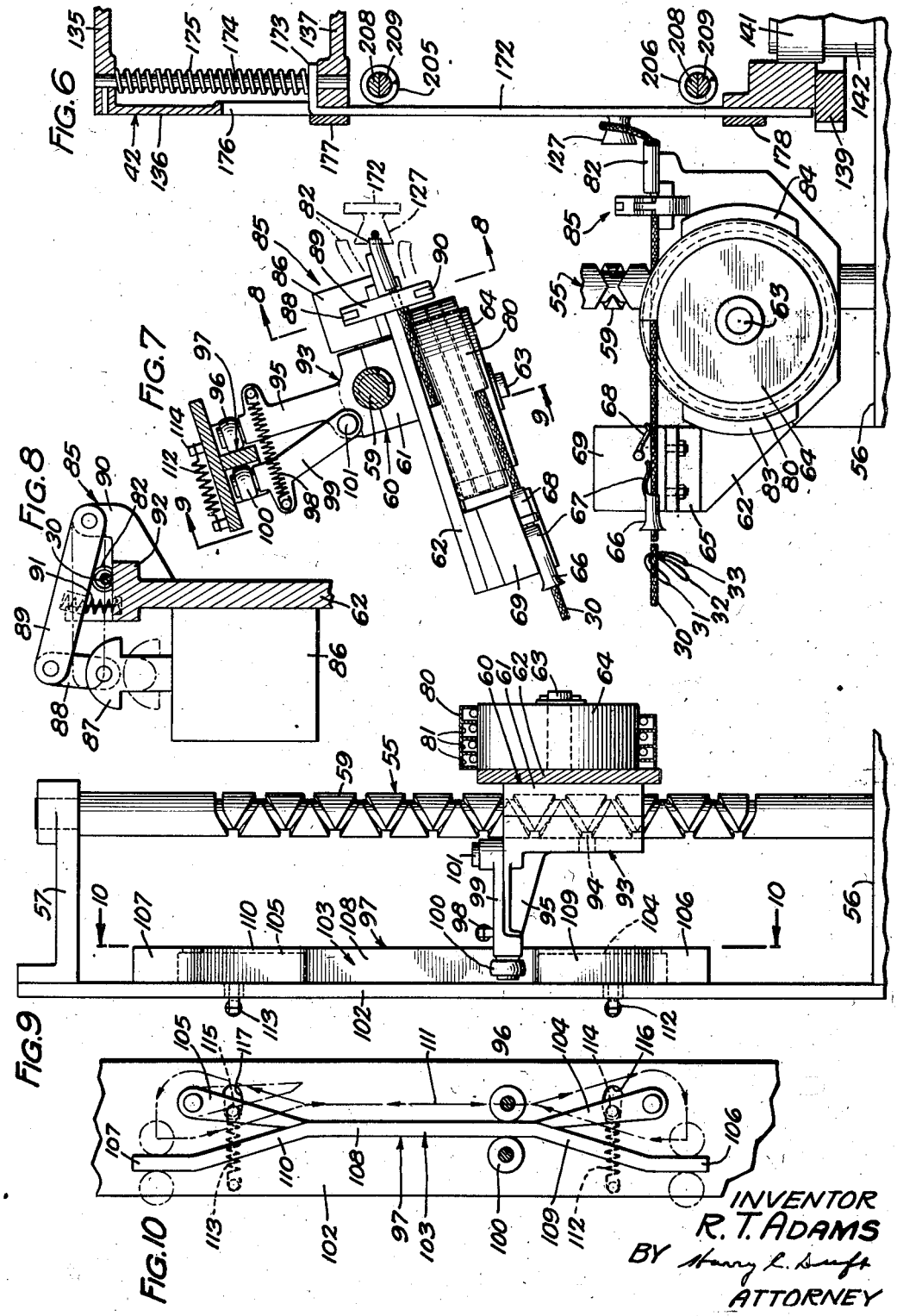

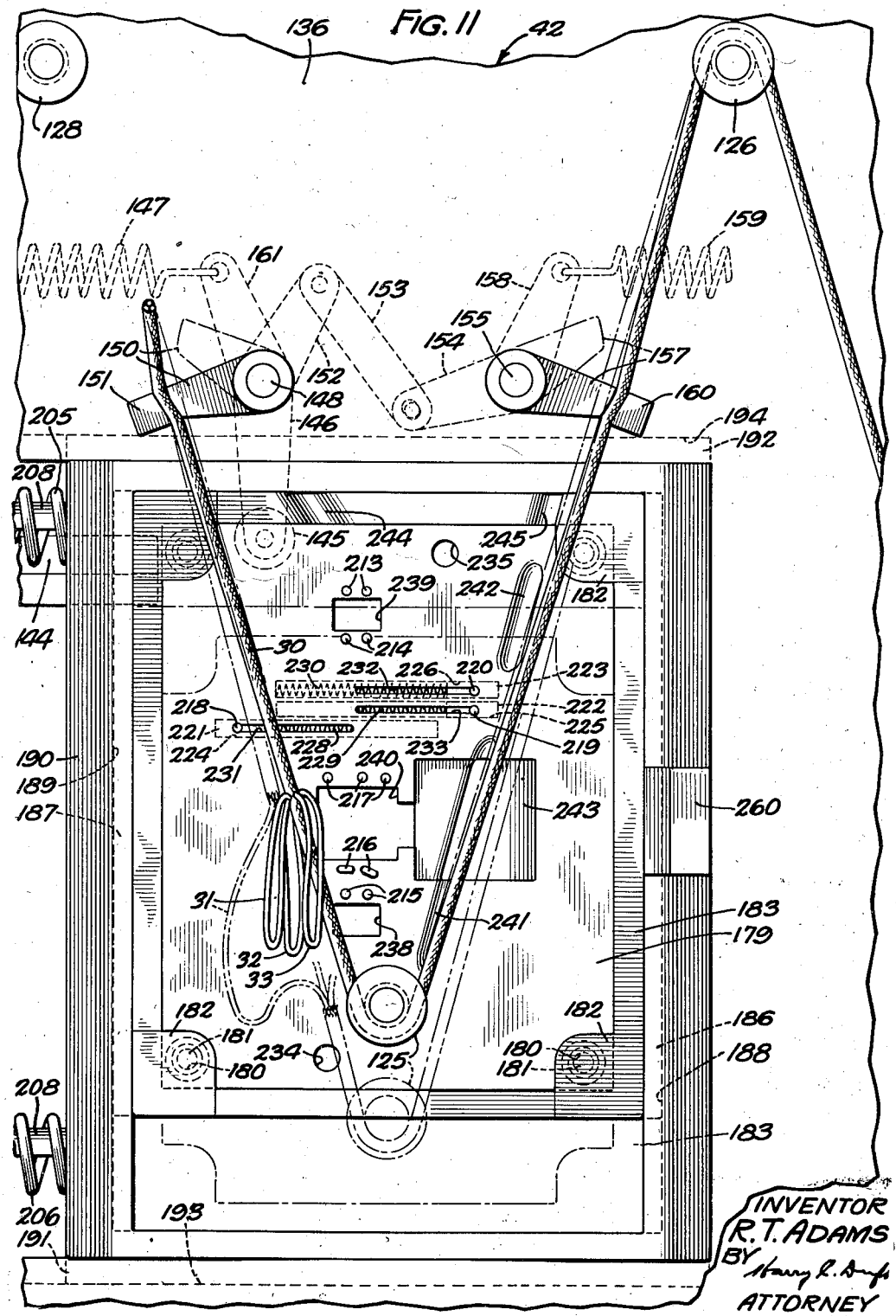

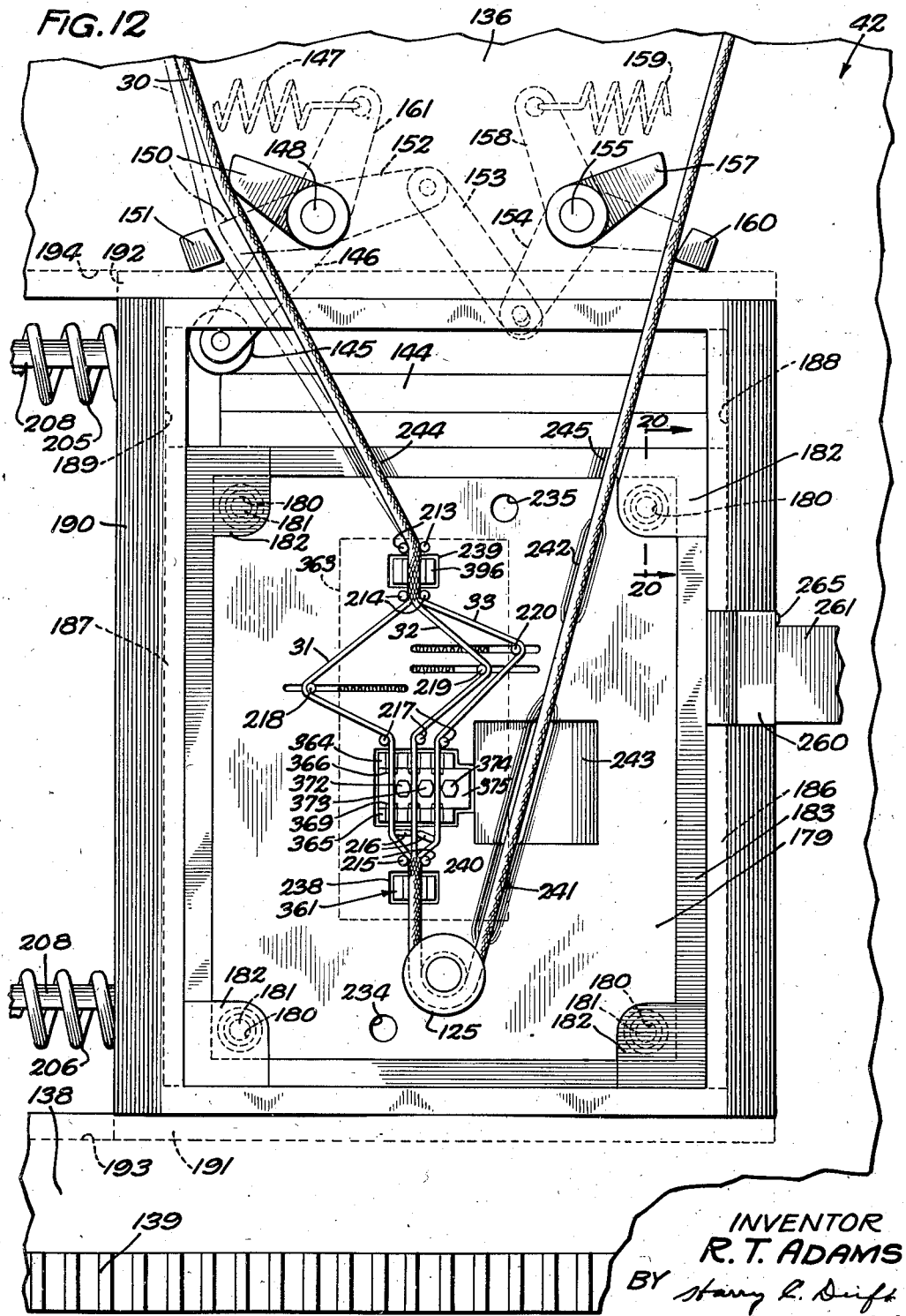

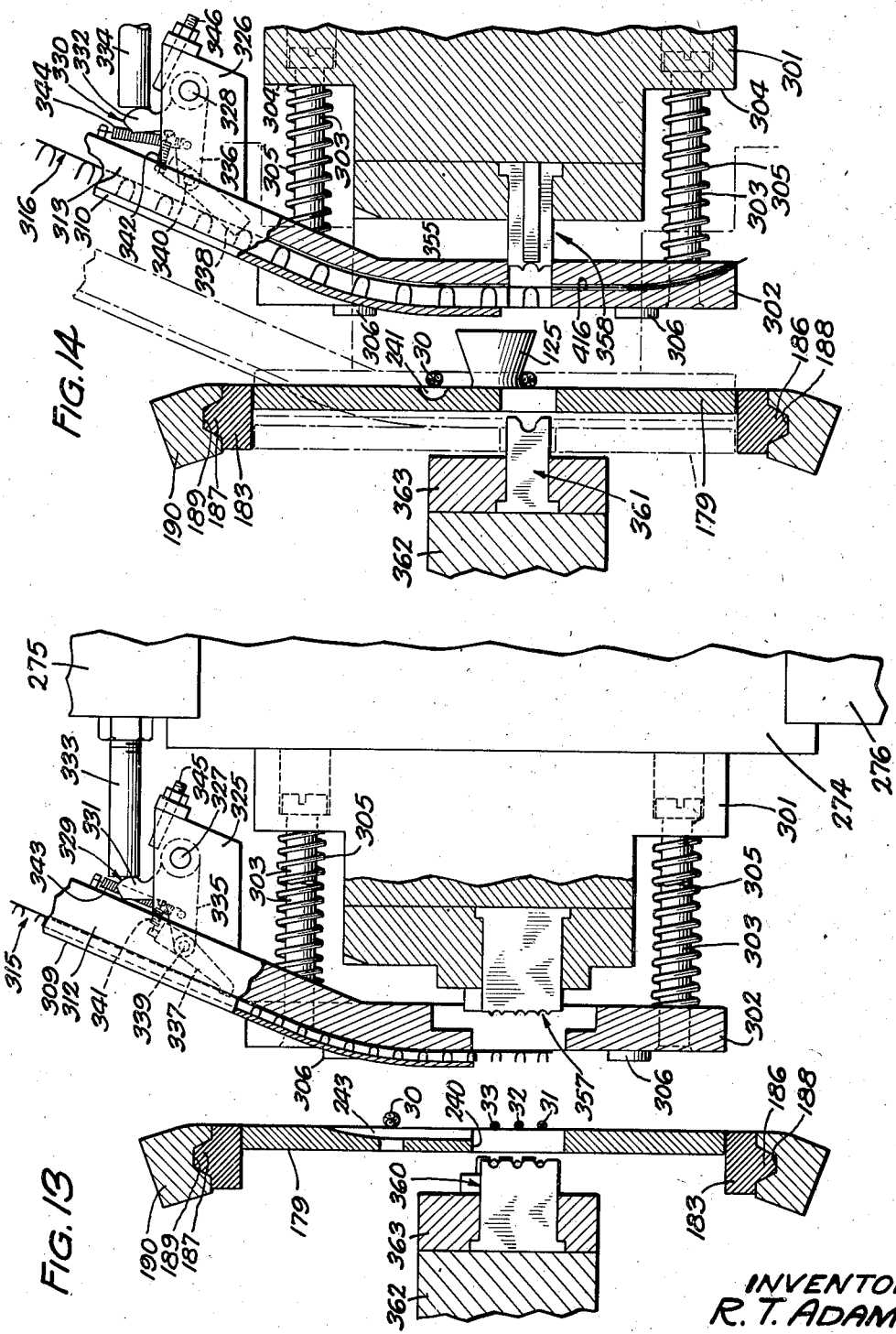

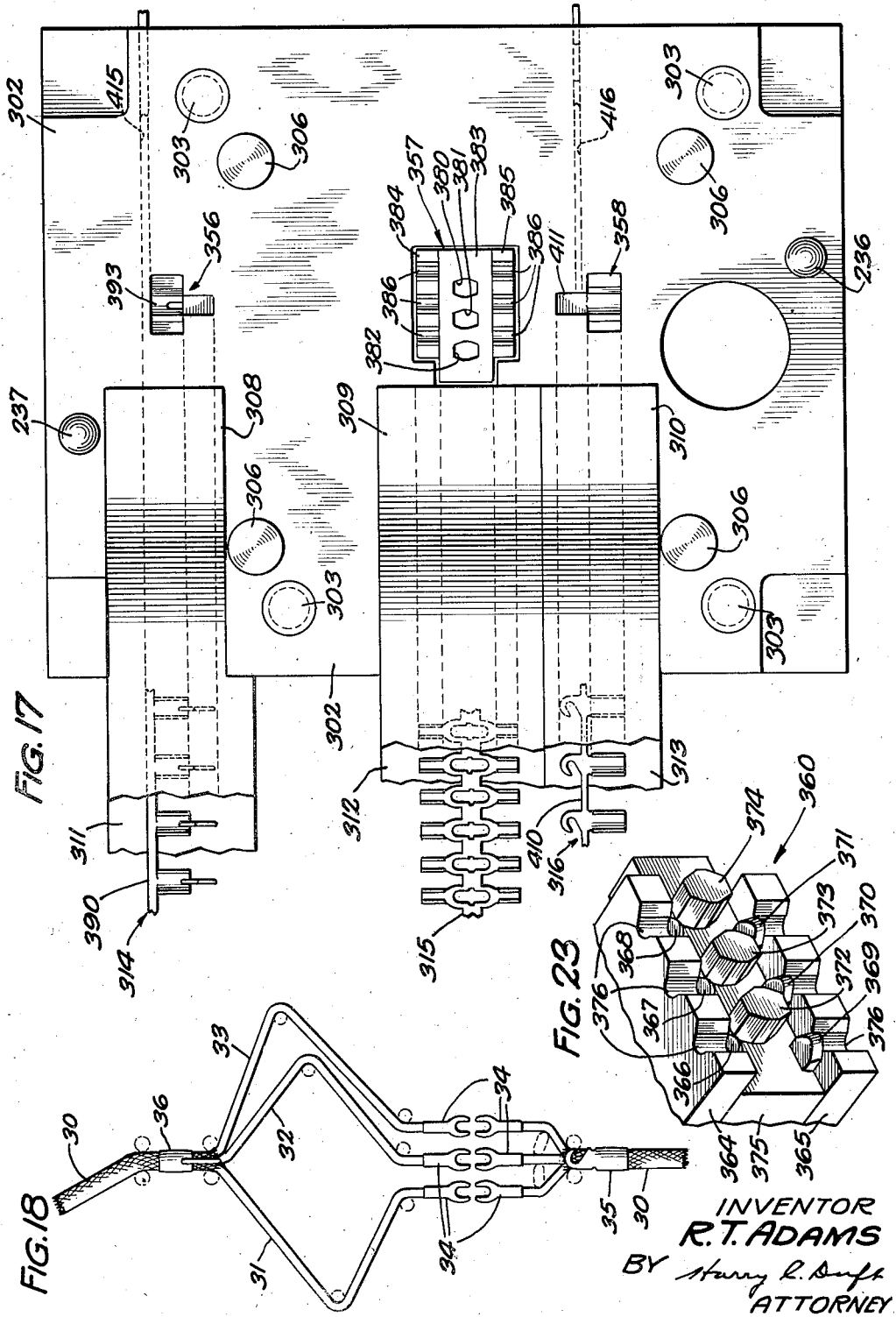

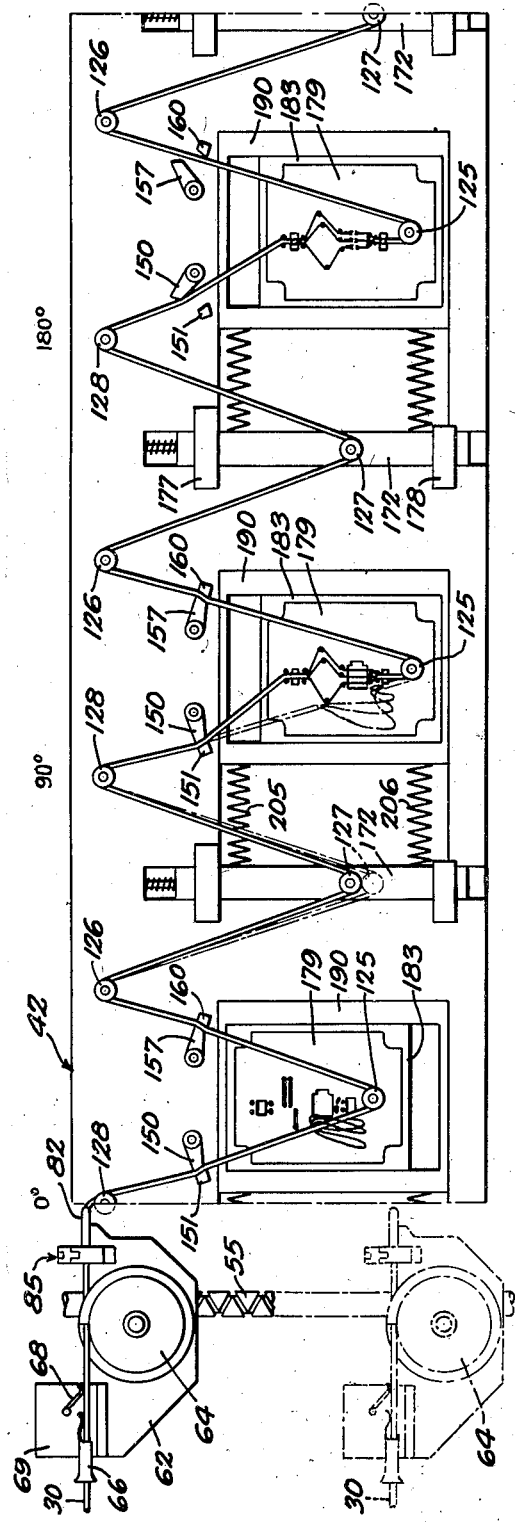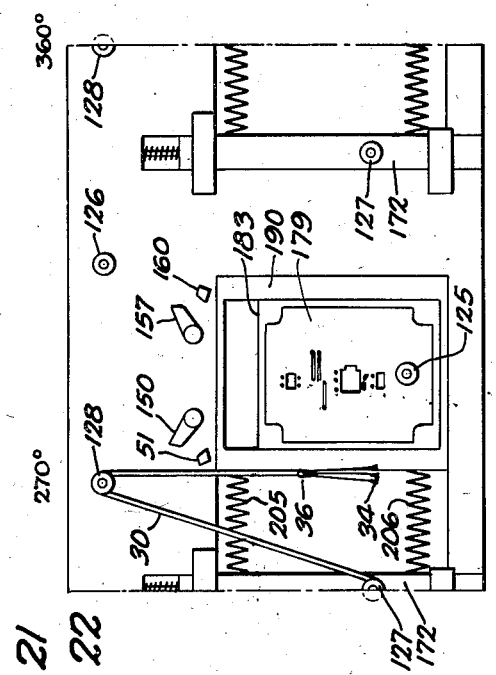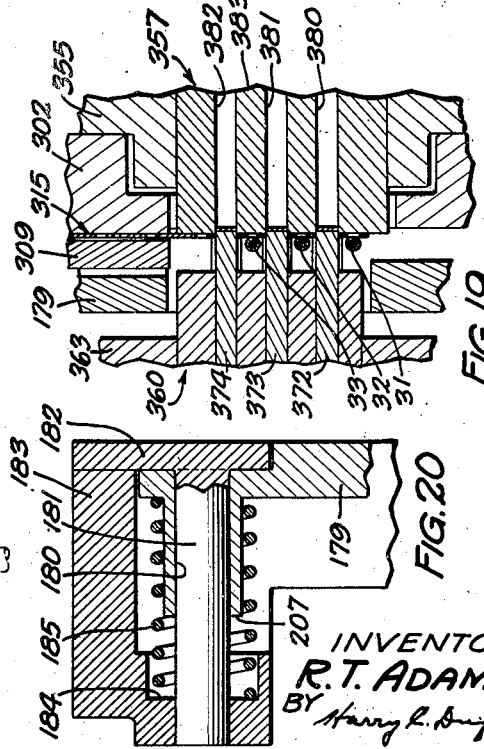

Patented June 17, 1947

2,422,282

UNITED STATES PATENT OFFICE 2,422,282

ARTICLE FORMING APPARATUS

Robert T. Adams, Baltimore, Md., assignor to Western Electric Company, Incorporated, New York, N. Y., a corporation of New York Application January 11, 1945, Serial No. 572,413

17 Claims. (Cl. 29—33)

1

This invention relates to article forming apparatus and more particularly to an apparatus for forming electrical connecting cords.

It is an object of the present invention to provide a simple and efficient mechanism for rapidly forming articles.

In accordance with one embodiment of the invention, connecting cords for use in the telephone and like industries are completely formed in the apparatus from cordage having the individual conductors comprising the core thereof thrown out through the braided cover at regular intervals. The cordage is fed by a distributor mechanism operating in timed relation to a rotatable turret in such manner that the distributing mechanism wraps the cordage around pulleys mounted on the turret and pulleys on movable plates carried by the turret and between clamping devices which grip the cord tightly during the movement of the movable plates whereby the braided covering on the cordage is broken at the point where the loops extend out through the cover. The individual conductors are then arranged on suitable spring pressed pins on the plates, which hold them under tension and properly locate the conductors and ends of the braid covering in position to have terminals attached to the conductors and to have stay bands and S-hooks attached to the ends of the braided covering by a punch press mechanism. In the punch press, the terminal members are attached to the individual conductors and are severed from a continuous strip of them, whereupon the individual conductors are cut against the surfaces of the terminals attached to the conductors, thus to completely form a cord for each operation of the punch press mechanism.

A complete understanding of the invention may be had by reference to the following detailed description when considered in conjunction with the accompanying drawings, wherein Fig. 1 is a front elevational view of an apparatus embodying the invention and showing the punch press and distributor, as well as the turret in elevation;

Fig. 2 is a plan view of the apparatus shown in Fig. 1 and showing the drive mechanism for the punch press, turret and distributor;

Fig. 3 is a fragmentary horizontal sectional view taken substantially along the line 3—3 of Fig. 1 in the direction of the arrows and showing details of the turret on a larger scale than they are shown in Fig. 1;

Fig. 4 is a fragmentary vertical sectional view taken substantially along the line 4—4 of Fig. 3

2 in the direction of the arrows and showing portions of the apparatus mounted on the turret;

Fig. 5 is a fragmentary vertical sectional view taken on the line 5—5 of Fig. 3 in the direction of the arrows showing some details of a carriage mechanism mounted on the turret;

Fig. 6 is a fragmentary detail view showing a portion of the distributing mechanism in front elevation and a portion of the turret in section;

Fig. 7 is a fragmentary sectional view taken through the distributing mechanism and showing portions thereof on a slightly larger scale than they are shown in Fig. 3;

Fig. 8 is a fragmentary sectional view showing details of construction of a solenoid actuated clamp mounted on the distributor for clamping the cord after a predetermined length thereof has been fed by the distributor mechanism;

Fig. 9 is an irregular sectional view taken substantially along the line 9—9 of Fig. 7 in the direction of the arrows showing portions of the distributor mechanism in elevation and other portions thereof in section;

Fig. 10 is a vertical sectional view taken substantially along the line 10—10 of Fig. 9 in the direction of the arrows showing cam tracks which control the movements of the distributor mechanism;

Fig. 11 is an enlarged fragmentary front elevational view of a portion of the turret showing one of the movable plates which supports one of the pulleys and is, in turn, supported on a slidable carriage;

Fig. 12 is a view similar to Fig. 11, but showing the cord after the braided covering thereon has been broken and the individual conductors have been aligned upon the pins which will hold them in position to be operated upon in the punch press mechanism;

Figs. 13 and 14 are fragmentary plan sectional views taken substantially along the lines 13—13 and 14—14 of Fig. 4 in the direction of the arrows and showing details of the mechanism for feeding and forming the terminals and the S-hooks;

Figs. 15 and 16 are irregular enlarged fragmentary vertical sectional views taken substantially along the line 15—15 of Fig. 2 in the direction of the arrows and showing the punch press dies in operative and inoperative positions, respectively;

Fig. 17 is a face view of the movable head of the punch press mechanism showing the alignment of the S-hooks, stay bands and terminals as they are fed to their respective forming tools;

Fig. 18 is a detail view on an enlarged scale of the individual conductors and braid covered cordage after they have had the terminals, stay band and S-hook attached to them in the punch press mechanism;

Fig. 19 is a fragmentary horizontal sectional view taken substantially along the line 19—19 of Fig. 16 in the direction of the arrows showing the cutting dies which cut the terminals apart;

Fig. 20 is a fragmentary detailed sectional view taken on the line 20—20 of Fig. 12 in the direction of the arrows showing the resilient mounting of the plate which holds the individual conductors and the cordage in position to have the various parts attached to them;

Figs. 21 and 22, when placed side by side with Fig. 22 to the right of Fig. 21, comprise a diagrammatic developed view of the turret showing the various mechanisms thereon in their operated condition around the turret; and Fig. 23 is a fragmentary view in perspective showing details of the stationary tools in the punch press which are employed in attaching the terminals to the individual conductors and cutting the conductors.

The apparatus as illustrated in the drawings is designed to have cordage 30, as shown most clearly in Fig. 11, fed to it with individually insulated conductors 31, 32 and 33 looped out through the braided covering on the cordage at predetermined intervals. In the operation of the apparatus, the braided covering on the cordage is broken apart at the points where the individually insulated conductors 31, 32 and 33 are looped out through the braided covering and two terminals 34 (Fig. 18) are attached to each conductor in the area between the broken ends of the covering. In addition, a stay band 35 and an S-hook 36 are applied to the outside of the braided covering on the cordage 30 just back of the point where the covering is broken to facilitate the mounting of the cords thus formed in electrical apparatus. A short section of each conductor 31, 32 and 33 is cut out between the terminals 34 whereby, in each cycle of the apparatus, a single double ended cord, having a stay band 35 at one end, an S-hook 36 at the other end and the three conductors with terminals 34 attached to them, is formed.

The apparatus is mounted upon a main base member 40 (Figs. 1 and 2) from which there extends a pedestal 41 for supporting a turret, designated generally by the numeral 42. The pedestal 41 is formed integrally with a press supporting bracket 43, which supports a horizontal type punch press, designated generally by the numeral 44. Mounted on the main base member 40 is a driving motor 45 adapted to drive the punch press 44 through a driving element 46, as shown in Fig. 1. In addition to the motor 45, the base 40 supports a drive motor 47 (Fig. 2) for driving the turret 42 and a distributor mechanism, designated generally by the numeral 48. A gear reduction unit 49 (Fig. 1), driven directly by the drive motor 47, drives a turret-driving shaft 50 and a distributor-driving shaft 51 at fixed speeds. A sprocket 52, mounted on the distributor-driving shaft 51, is connected, by means of a chain 53, to drive a sprocket 54 mounted upon a distributor shaft, designated generally by the numeral 55. The distributor shaft 55 is journalled in a shoulder 56 (Fig. 1) formed on the pedestal 41 and in a tie plate 57, which is, in turn, fixed to a stationary shaft 58 mounted in the pedestal 41.

The distributor shaft 55 (Figs. 6, 7 and 9) has a threaded portion 59 for guiding and driving a distributor bracket 60. The distributor bracket 60 is made in two parts, which, as seen most clearly in Fig. 7, are clamped together to surround the threaded portion 59 of the shaft 55. One of the portions 61 of the bracket 60 has a plate 62 mounted upon it, which carries a stud shaft 63 for rotatably supporting a drum 64. The plate 62 also supports a bracket 65 (Fig. 6), carrying a guide funnel 66, which serves to guide cordage 30 from a reel thereof (not shown) to the apparatus. The guide funnel 66 has an extending portion 67, which is slightly resilient, for clamping the cordage 30 down onto the upper surface of the bracket 65 to guide the cordage under a switch lever 68 of a switch 69. The switch lever 68 is so adjusted that when the extending loops of individually insulated conductors 31, 32 and 33 pass under the lever 68, the lever will be moved sufficiently to close a switch 69.

Encircling the drum 64 is a spiral guide 80 (Figs. 6, 7 and 9) having a spiralled passage 81 formed in it for guiding the cordage 30 progressively from the outer or forward edge of the drum 64 (the right hand edge Fig. 9) toward a guide tube 82 mounted upon the plate 62. The spiral guide 80 is provided with a pair of extending tabs 83 and 84, whereby it is attached to the plate 62. Mounted on the plate 62 just to the left of the guide tube 82 is a clamping device 85, which, as shown most clearly in Figs. 7 and 8, comprises a solenoid 86 having a movable core member 87, which is attached, through a link 88, to a clamping lever 89. The lever 89 is pivoted on a bracket 90 and is adapted, upon energization of the solenoid 86, to compress a spring 91, which normally urges the lever 89 upwardly (Fig. 8) and to clamp the cordage 30 against a ledge 92 formed on the plate 62. The purpose of this mechanism will become apparent as the description progresses.

The second portion of the distributor bracket 60, designated by the numeral 93, cooperates with the portion 61 to form a bearing sleeve encircling the threaded portion 59 of the distributor shaft 55. This portion 93 of the distributor bracket 60 has a key 94 mounted in it which extends into the threads of the threaded portion 59 and thus, when rotation is imparted to the distributor shaft 55, the distributor bracket 60 will travel alternately upwardly and downwardly on the shaft 55 due to the configuration of the threads in the threaded portion 59, as shown most clearly in Fig. 9. The portion 93 of the bracket 60 has an arm 95 formed integrally therewith which carries a cam roller 96 at its free end. The cam roller 96 is urged to bear against a cam track, designated generally by the numeral 97, by a compression spring 98, which is fixed to the arm 95 and to a cam lever 99 carrying a cam roller 100 against the opposite side of the track 97 and pivoted on a pivot pin 101 fixed to the arm 95.

The cam track 97, as shown most clearly in Figs. 9 and 10, is mounted upon a plate 102 attached to the tie plate 57 and to the shoulder 56 on the turret 41. The cam track 97 comprises a main fixed cam member 103 and a pair of pivotally mounted cam members 104 and 105 mounted adjacent to the lower and upper ends of the fixed cam member. The main fixed cam member has straight portions 106 and 107 at its lower and upper ends, which are joined to a central straight section 108 by sloping sections 109 and 110, respectively. The pivoted cam members 104 and 105 are urged to engage the ends of the sloping sections 109 and 110 at the point where they merge with the central straight portion 108 and thus the cam roller 96 will travel in the path indicated by the dot and dash line 111 when the distributor bracket 60 is reciprocated by the distributor shaft 55. The pivotally mounted cam members 104 and 105 are urged to the left (Fig. 10) by contractile springs 112 and 113, respectively, which are attached to the plate 102 and to pins 114 and 115 fixed to the cam members 104 and 105 and extending through slots 116 and 117 in the plate 102.

From the foregoing, it is believed to be apparent that when rotation is imparted to the distributor shaft 55, the distributor bracket 60 will travel up and down on the shaft 55 and the bracket 60 will be oscillated adjacent to the upper and lower ends of its travel by the cooperative action of the cam track 97 and the cam rollers 96 and 100. The purpose of this will become apparent as the description progresses.

By reference to Figs. 1 and 3, it will be noted that the guide tube 82 is mounted to move in close proximity to the periphery of the turret 42 and since the turret 42 rotates in timed relation to the operation of the distributor mechanism 48, the tube 82 will feed cordage 30 around sets of pulleys 125—125, 126—126, 127—127 and 128—128 mounted upon the turret 42 (Figs. 3, 21 and 22) of which there are provided four sets spaced at intervals around the turret 42. Pulleys 126 and 128 are freely rotatable on stud shafts 129—129 fixed to the upper portion of the turret 42, as illustrated in Fig. 5, whereas the pulleys 125 and 127 are not only freely rotatable on their shafts but are movably mounted, as will be described hereinafter.

The turret 42 (Fig. 4) comprises an upper bearing sleeve 130, which is freely rotatable about the stationary shaft 58, a bearing 131 being interposed between the shaft 58 and sleeve 130. The lower end of the sleeve 130 has a shoulder 132 formed on it which bears upon a bearing member 133 encircling the shaft 58 and positioned on the upper end of a reduced portion 134 of the pedestal 41. Attached to or formed integrally with the sleeve 130 is a top plate 135 of annular configuration, which extends horizontally and has depending from it an annular skirt 136, which comprises the outer surface of the turret 42. The skirt 136, in addition to being supported by the top plate 135 which extends from the sleeve 130 to the skirt, is braced by a spider 137 extending from the sleeve 130 to a point intermediate the ends of the annular skirt 136. The skirt 136 extends downwardly to a point adjacent to the shoulder 56 and has suitably attached to or formed integrally with it a support ring 138, to the under-surface of which a ring gear 139 is fixed. The ring gear 139 (Fig. 2) meshes with a spur gear 140 mounted upon the turret driving shaft 50. In this manner, rotation will be imparted to the turret 42 when the motor 47 is operated. In order to hold the lower portion of the skirt 136 in its proper place during its rotation with turret 42, the support ring 138 bears against a plurality of guide rollers 141—141 (Fig. 4) mounted upon stud shafts 142—142 disposed about the top of the base portion of the pedestal 41 in position to bear against the ring.

Mounted upon the upper surface of the reduced portion 134 (Fig. 4) of the pedestal 41 is a cam track supporting plate 143, carrying at its periphery a stationary cam 144, which is adapted to be engaged by cam rollers 145—145 carried on the lower ends of cam levers 146—146 (Figs. 3, 4, 11 and 12). The cam 144 extends only part way around the pedestal 41 and, where it is interrupted, will release the cam rollers 145 and permit springs 147—147 to rock the cam levers counter-clockwise, as viewed in Figs. 11 and 12, that is, from the position shown in Fig. 12 to the position shown in Fig. 11. The levers 146—146 are each fixed to a stud shaft 148, mounted, as shown most clearly in Fig. 3, in a bearing 149 mounted on the skirt 136 of the turret 42, and the levers 146 are each interconnected with their spring 147 by means of a lever 161, also attached to the shaft 148. Each of the shafts 148 carries a clamping member 150 on the outside of the turret to cooperate with a stationary clamping member 151, also mounted on the outside of the skirt 136 of the turret. Also fixed to each of the shafts 148 is a lever 152, which is interconnected by a link 153 with a lever 154. The lever 154 is, in turn, fixed to a stud shaft 155 mounted in a bearing 156 and carrying a clamp 157 and a lever 158. A spring 159 normally urges the lever 158 to rock clockwise (Figs. 11 and 12) to move the clamping member 157 into operative association with a stationary clamping member 160, similar to the clamping member 151. The springs 147 and 159 are attached to pins 162 extending upwardly from the spider 137.

Through the linkage just described and, by the action of the springs 147 and 159, the clamping members 150 and 157 will be rocked into cooperating relation with their associated stationary clamping members 151 and 160 each time their associated cam roller 145 rolls off the upper surface of the interrupted annular cam 144, thus to clamp cordage 30 to the skirt 136 of the turret 42. The configuration of the cooperating faces of the movable and stationary clamping members 150, 151, 157 and 160 is such that any downward pull on the cordage 30 will tend to clamp the clamping members against the cordage more tightly than the springs clamp them and, therefore, the cordage will be held at spaced points so that downward movement being imparted to pulley 125 will cause the braided covering on the cordage to be broken. Since the weakest spot in the covering is at the point where the individually insulated conductors 31, 32 and 33 extend out through the braided covering, the covering on the cordage will be broken at that point if that point in the cordage is somewhere between the pulley 125 and the cooperating sets of clamping members 150 and 151 and 157 and 160.

Inasmuch as the turret 42 and the distributing mechanism 48 are both driven from the same motor and operate in timed relation, it is possible to feed the cordage at such a rate that the point where the conductors extend through the covering will be properly positioned in the apparatus if the cordage were formed with sufficient accuracy. However, in order to compensate for any slight irregularities in the distance between the points where the individually insulated conductors are thrown out through the braided covering on the cordage, the distributor mechanism is provided, as described hereinbefore, with the solenoid actuated clamping device 85, which operates under control of the switch 69 to stop feeding cordage each time the extending loops of individually insulated conductors pass the switch lever 68. In addition to the provision of this mechanism, which cooperates with a switch 170 mounted upon the tie plate 57 (Fig. 1), the pulley 127 is mounted in such manner that it may move up and down a limited amount with respect to the skirt 136 of the turret 42. The switch 170 is connected in series with the switch 69 and is a normally closed switch which is opened and held open by one of a plurality of plates 169 mounted on the turret 42, for a length of time sufficient to permit the looped out conductors to be drawn past the switch lever 68. The plates 169 may be positioned on the turret in such manner that feeding of cordage will be reinitiated each time switch 170 engages a plate 169 to properly position the succeeding loops.

As stated hereinbefore, the rollers 127 are movably mounted with respect to the turret 42 and, as shown most clearly in Figs. 3 and 6, the rollers 127 are freely rotatable on a plate 172, which is slidably mounted with respect to the turret 42. The plate 172 has a horizontally extending portion 173 provided with a suitable aperture to receive a guide pin 174, which is fixed in the top plate 135 and in the spider 137. A compression spring 175 is interposed between the undersurface of the top plate 135 and the upper surface of the horizontally extending portion 173, whereby the plate 172 is normally urged downwardly and slidable in a slot 176 formed in the skirt 136, being held in place in the slot by retaining plates 177 and 178 fixed to the skirt 136.

As previously stated, the rollers 125 are movable with respect to the turret 42. These rollers are mounted upon plates 179 and the plates, as shown most clearly in Figs. 11, 12 and 20, are each provided with four apertures 180 adjacent their corners for receiving liner pins 181, which are suitably attached to or formed integrally with corner plates 182 attached to a rectangular framework 183. Surrounding the pins 181 and interposed between the inner surfaces of the plate 179 and a pocket 184 in the framework 183 are compression springs 185, which normally urge the plates 179 into engagement with the corner plates 182, as shown most clearly in Figs. 4 and 20. In this manner, the plates 179 are normally carried around the turret with their outer surfaces substantially flush with the outer surface of the corner plates 182. The rectangular framework 183, as shown most clearly in Figs. 13 and 14, has tongues 186 and 187 formed on its sides extending into and slidable in grooves 188 and 189 of a carriage frame 190, whereby the rectangular framework 183 may be reciprocated vertically with respect to the carriage frame 190. The carriage frame 190 (Fig. 4) has lower and upper tongues 191 and 192 formed on its bottom and top surfaces which are arcuate in configuration to engage in arcuately cut grooves 193 and 194 formed in the support ring 138 and spider 137, respectively, whereby the carriage frame 190 may be moved bodily about the axis of the shaft 58 relative to the turret 42. This relative movement of the carriage frame 190 with respect to the turret 42 permits the punch press mechanism 44 to perform operations upon the cordage carried by the plate 179 when the plate is in the punch press station and is held therein, as will be described hereinafter.

Throughout the major portion of its travel around the axis of the turret 42, the plate 179 is held in its lowermost position with respect to the carriage frame 190 by a cam roller 195 attached to the rear of the rectangular framework 183, as shown most clearly in Fig. 4. The cam roller 195 rides in a cam track 196, which is suitably secured to the portion 134 of the pedestal 41 and which extends all the way around the pedestal.

As stated hereinbefore, the roller 195 is carried by the plate 179 and, when the plate 179 is carried downwardly by the rectangular framework 183 sliding with respect to the carriage frame 190, the covering on a length of cordage which has been wrapped around the pulley 125 and which has been clamped by the clamping members 150, 151, 157 and 160 will be broken at the point where the individually insulated conductors extend through the braid covering on the cordage. The configuration of the interrupted cam track 144 and the cam track 196 are such that when the framework 183 is moved downwardly, the clamping members actuated by the cam rollers 145 will be in clamping engagement with the cord and thus the braid covering on the cord will be broken. This operation occurs in the first quarter of the cycle of travel of a plate 119 around the shaft 58.

The carriage framework 190 is normally urged to the position shown in Figs. 1, 11, 12, 21 and 22 by a pair of compression springs 205 and 206, which, as shown most clearly in Figs. 1, 3 and 12, are interposed between the left side of the carriage framework 190 and a block 207 fixed to the skirt 136. The springs 205 and 206 encircle arcuately shaped half-round rods 208 and 209, which are attached to the side of the carriage framework 190 and the block 207, respectively, to guide the springs when they are compressed.

Mounted upon each of the plates 179 (Fig. 12) are four sets of stationary pins 213—213, 214—214, 215—215 and 216—216. These pins extend from the plate 179 a distance such that the pins 213, 214 and 215 cooperate with pulley 125 to hold the cordage 30 in position to have a stay band 35 and an S-hook 36 attached to it by the punch press mechanism. The pins 216 cooperate with a set of three stationary pins 217 and three movable pins 218, 219 and 220 to properly position the individually insulated conductors 31, 32 and 33 to receive the terminals 34. As shown most clearly in Figs. 11, 15 and 16, the pins 218, 219 and 220 are mounted upon slidable blocks 221, 222 and 223, respectively, which are slidably mounted in slots 224, 225 and 226 formed in the plate 179, being held in position in the slots by a retainer plate 227 and normally being urged to the positions shown in Fig. 11 by compression springs 228, 229 and 230. In the operation of the apparatus, after a cord has had its braid covering broken due to the movement of the pulley 125 downwardly with the plate 179 while the clamps 150, 151, 157 and 160 are clamping the cordage 30, the individual conductors 31, 32 and 33 may be placed by an operator in the position shown in Fig. 12 and, while held in that position, the turret 42, rotating, will carry the plate 179 into the punch press position. The pins 218, 219 and 220 extend through slots 231, 232 and 233 in the plate 179.

In addition to the assemblage of pins on the plate 179 for properly positioning the cordage and the conductors 31, 32 and 33, the plate 179 is provided with a pair of liner pin holes 234 and 235, which are adapted to receive liner pins 236 and 237 (Figs. 4 and 17) forming a portion of the punch press mechanism. The plate 179 has apertures 238 and 239 (Figs. 11, 15 and 16) through which stay band and S-hook forming tools, to be described in connection with the punch press mechanism, may pass in the attachment of these members to the cordage and the plate is also provided with an aperture 240, through which terminal forming tools may pass in the punch press portion of the apparatus. Since the portion of the cordage which extends across the right half of the plate 179 (Fig. 12) is not operated upon by the tools in the punch press, this portion of the cordage is pushed into aligned grooves 241 and 242, which are disposed upon opposite sides of a depression 243 formed in the plate 179 at the point where a portion of the mechanism which feeds strips of terminals to the punch press mechanism tools will move in the operation of the punch press. Similar grooves are formed, as shown at 244 and 245, to receive the cordage when the punch press tools are operating upon some portions of them.

After the braid covering on the cordage has been broken and the cordage and conductors have been properly placed upon the plate 179, the plate will move into the punch press portion of the apparatus. As a plate 179 moves into the punch press portion of the apparatus, an abutment member 260 (Figs. 2, 3 and 12) carried on the carriage frame 190, will engage a blocking lever 261, which is pivotally mounted on a pin 262 carried by the bracket 263, which is, in turn, mounted upon the pedestal 41. The lever 261 carries a switch 264, which has an actuating lever 265 extending from it in position to be engaged by the abutment 260. The lever 261 serves to block movement of the carriage frame 190, thus to hold the plate 179 in position in the punch press during the operation of the punch press, which operation is initiated upon closure of the switch 264, the contacts (not shown) of which will close a circuit to energize a trip solenoid 266. Energization of the solenoid 266 will cause it to attract its core 267 to rock a dog actuating lever 268 to a position to release the punch press clutch for driving the punch press through one cycle of operation. The details of the punch press clutch are not shown herein since they may be of any suitable type which will connect a fly wheel 269 driven by the driving element 46 to an eccentric drive shaft 270 to drive the shaft 270 through one cycle. The drive shaft 270 (Fig. 2) is mounted in suitable bearings 271 and 272 and serves to actuate a cross head actuating member 273, which, in turn, drives a press head 274. The press head 274 is slidable in a pair of ways 275 and 276, which are mounted on the press supporting bracket 83, which also serves to support the bearings 271 and 272. Mounted upon the shaft 270 is a cam member 277, having cooperating therewith a cam roller 278. The cam roller 278 is freely rotatable on an arm of a bell crank lever 279, which is pivoted for oscillation on a pivot pin 280 carried by a bracket 281, which, in turn, is mounted on the press supporting bracket 43. The arm of the bell crank lever 279, opposite to that which carries the roller 278, is interconnected with the lever 261 by a link 282, which is normally urged to the right (Fig. 2) by a contractile spring 283 attached to the link 282 by means of a pin 284 and to the bracket 281 by means of a bent pin 285.

From the foregoing, it is believed to be apparent that the link 282 normally tends to hold the blocking lever 261 in position to engage an abutment 260 on a carriage frame 190 when the turret 42 carries a carriage frame into the press position. When the abutment 260 engages the blocking lever 261, the switch 264 will be operated and will energize the solenoid 266 to cause the press to go through one complete cycle.

When the press goes through one complete cycle, the press head 274 will be advanced to the left from the position shown in Fig. 2 and then retracted to perform the operations incident to the attaching of terminals, an S-hook and a stay band on cordage carried by the plate 79. Near the end of its single cycle of operation, the shaft 270 of the press will drive the cam 277 to a position where the bell crank lever 279 will be rocked counter-clockwise to release the blocking lever 261 from the abutment 260, thus to permit the springs 205 and 206 to move the carriage frame 190 back into engagement with the surface of the apron 136 at the right of the grooves 193 and 194.

The press head 274 carries a tool supporting block 301, on which are mounted a series of tools which attach S-hooks 36 and stay bands 35 to the ends of the braid-covered cord, and which attach terminals 34 to the individual conductors 31, 32 and 33. As may best be seen by reference to Figs. 12 to 17, inclusive, the tool supporting block 301 has resiliently mounted on it a plate 302, which is carried by posts 303—303 slidable in the tool supporting block 301 and fixed to the plate 302. Interposed between shoulders 304—304 on the block 301 and the plates 302 are compression springs 305, which normally urge the plate 302 to the left, as viewed in Figs. 13 and 14. The plate 302 is provided with bumper pads 306, which will engage the surface of one of the plates 179 in the punch press position of the apparatus and in the operation of the press will press the plate 179 inwardly until shoulders 207 on the plate 179, which surround the liner pin 181, engage the base of the pocket 184 on the framework 183. The springs 305, which are weaker than springs 185, will be compressed first and the tool supporting block 301 will move with respect to the plate 302 before it moves the plate 179.

The plate 302 carries three guide plates 308, 309, and 310, which cooperate with guide members 311, 312 and 313 formed integrally with or attached to the plate 302 to guide interconnected strips 314, 315 and 316 of S-hooks 36, terminals 34 and stay bands 35, respectively, to the press. The cooperating surfaces of the guide members 311, 312, 313 and the guide plates 308, 309 and 310 serve to direct the interconnected strips 314, 315 and 316 to the place where the S-hooks, terminals and stay bands will be attached to the cordage and individual conductors. In order to feed the interconnected strips 314, 315 and 316 to position to be acted upon by the press, feeding devices are provided for engaging and feeding a predetermined length of the strips toward the position where they will be operated upon. Two of these mechanisms are shown most clearly in Figs. 13 and 14, that is, the feeding mechanism for the terminals and stay bands. The third feeding mechanism, that is, the S-band feeding mechanism, is of exactly the same construction as the stay band feeding mechanism.

Mounted on the guide members 312 and 313 are a pair of blocks 325 and 326, which carry pins 327 and 328 for pivotally supporting cam levers 329 and 330, respectively.

The cam levers 329 and 330 have cam arms 331 and 332 adapted to engage adjustable abutments 333 and 334, respectively, each time the tool supporting block 301 is retracted to inoperative position. Mounted upon arms 335 and 336 of the bell crank levers 329 and 330 are feed levers 337 and 338, respectively. The feed levers 337 and 338 are pivotally mounted on the arms 335 and 336 and are urged to rock clockwise about pivot pins 339 and 340 by contractile springs 341 and 342 attached to the levers 337 and 338 and to the bell crank levers 329 and 330, respectively. The bell crank levers 329 and 330 are in turn urged to rock clockwise about their pins 327 and 328 by contractile springs 343 and 344, which are attached to them and to the guide members 312 and 313, respectively. Adjustable abutment screws 345 and 346 serve to limit the movement of the bell crank levers 329 and 330 under the action of their respective springs and thus will limit the amount of oscillation imparted to the bell crank levers by the co-action of their respective springs and abutment posts 333 and 334.

When the tool supporting block 301 is moved to the left, as viewed in Figs. 13 and 14, the spring arrangement associated with the feed levers 337 and 338 will retract the springs to position to feed a new length of interconnected strips of terminals 315 and interconnected strips of stay bands 316 the next time the tool supporting block is retracted to the position shown in Figs. 13 and 14. It will be understood that the levers 337 and 338 engage surfaces of the interconnected strips associated with them to effect their feeding operation and that the feeding of the interconnected strips 314 of S-hooks 36 is exactly the same as feeding of the interconnected strips 316 of stay bands 35.

Mounted upon the tool supporting block 301 is a retainer plate 355, which serves to hold three sets of tools 356, 357 and 358 adapted to operate upon the interconnected strip 314 of S-hooks, the interconnected strip 315 of terminals and the interconnected strip 316 of stay bands, respectively. These tools cooperate with three sets of tools 359, 360 and 361 held in place upon a tool bed 362 by a retainer plate 363 (Figs. 13 and 14). The tool bed 362 (Figs. 3 and 4) is mounted upon the bearing member 134 and extends outwardly to properly position the tools carried by it at the punch press portion of the apparatus.

As shown most clearly in Fig. 23, the set of tools 360 comprises two forming tools 364 and 365, six conductor shearing tools 366, 367, 368, 369, 370 and 371, and three strip shearing punches 372, 373 and 374. The three strip shearing punches 372, 373 and 374 are mounted in a tool holding block 375, which cooperates with the forming tools 364 and 365 to support the conductor shearing tools 366 to 371, inclusive. Each of the forming tools 364 and 365 is provided with three forming notches 376—376 having a rounded bottom forming surface and tapered side surfaces joining said rounded bottom surfaces, whereby, when partially formed terminals, having the strip from which they are formed bent to U-shape, engage the side surfaces, they will be directed around a conductor and then, upon being further pressed in the forming notches, will tightly engage the conductors.

The strip shearing punches 372, 373 and 374 cooperate with die apertures 380, 381 and 382 (Fig. 17) formed in a die block 383, comprising a part of the set of tools 357. In addition to the die block 383, the set of tools 357 includes two forming tools 384 and 385 adapted to cooperate with the forming tools 364 and 365, respectively. the forming tools 384 and 385 each having a series of three notches 386—386 formed in them which are in alignment with the forming notches 376—376 on the tools 364 and 365 and will engage the interconnected strip 315 of terminals 34 to form the conductor engaging portions of the terminals around the conductors. The flat exposed surface of the die block 383 will cooperate with the shearing tools 366 to 371, inclusive, to form a backing for the terminal portions of the terminal members 34, against which the tools 366 to 371, inclusive, will cut the individual conductors 31, 32 and 33 at two places closely adjacent the portion of each terminal 34, which is wrapped around the conductor by cooperating forming tools. These sets of tools 357 will thus cooperate with the set of tools 360 to complete the formation of the terminals 34 and to shear the individual conductors against the terminals after the terminals have been attached to the conductor.

The interconnected strip of S-hooks 314 which is fed to the punch press portion of the apparatus includes a strip 390, which serves to interconnect the S-hooks 36 in the strip 314 and in the operation of the apparatus, the S-hooks are sheared from this strip. After the plate 302 has been moved to position to engage its bumper pads 306 with the plate 179, the plate 302 will be held stationary momentarily and the springs 305 will be compressed, whereby the sets of tools 356, 357 and 358 will move relative to the plate 302. As the set of tools 356 moves relative to the plate 302, the upper edge 391 of the set of tools 356 will cooperate with a slot 392 in the plate 302 to shear an S-hook from the interconnected strip 314. The surface 391 is formed on a tool 393, having a notch 394 therein into which the depending portion 395 of the S-hook will enter and the extending surface of the tool 393 is rounded so that it will engage the portion of the S-hook which is to be slipped onto the cordage 30. The set of tools 359 comprises a forming tool 396 (Fig. 16) having a notch 397 formed in it to engage the extending serrated ends of the S-hook ring and fold it around the cordage 30. The notch 397 terminates in a pair of slanting walls 398, which serve to direct the serrated edges of the S-hook into the notch 397.

The sets of tools 358 and 361 are similar to the sets of tools 356 and 359 and cooperate to attach a stay band 35 to the cordage 30 each time the punch press is operated. The interconnected strip of stay bands 316 is interconnected by a web 410, which is sheared in the operation of the punch press just prior to the engagement of the stay band with the cordage 30 and the set of tools 358 includes a shearing tool 411 which cooperates with a slot 412 in the plate 302 to shear the web 410. The set of tools 358 also includes a forming notch 413, which engages the base of a stay band and cooperates with a forming notch 414 in the set of tools 361, which is formed similarly to the forming tool 396 to attach the stay band to the cordage 30.

As the punch press operates repeatedly, the strip 314, from which the S-hooks 36 are sheared, will be fed out of the plate 302 through a passageway 415 formed in the plate. Similarly, the pieces of web 410 sheared from the strip 316 will be pushed through a passageway 416, also formed in plate 302.

In the operation of the apparatus as illustrated most clearly in Figs. 21 and 22, cordage 30 may be directed from a suitable supply thereof and threaded through the guide funnel 66 and thence around the drum 64 and through the clamping device 85 and guide tube 82 to position adjacent the turret 42. Thereafter, the cordage may be directed over the roller 128 and between the clamping members 150 and 151, which may be released manually against the action of the actuating spring 147 for the clamping member 150.

The cordage may then be directed around the pulleys 125, 126, 127 and 128 and into position between the cooperating clamping members 157 and 160 to prepare the apparatus for operation. If no cordage had previously been positioned in the apparatus, the cordage may be positioned only on the first plate 179 and clamped between the first set of clamping members 157 and 160 with the looped-out conductors as shown in the left-hand position of the plate 179 in Fig. 21. Thereupon, power may be supplied to the punch press motor 85 and to the main drive motor 47 to drive the turret 42 and distributor mechanism 48. As soon as power is supplied to the motor 47, the distributor bracket 60 will be reciprocated along the length of the distributor shaft 55 in timed relation to the rotation of the turret 42. As the distributor bracket 60 travels up and down, it will be guided by the cam track 97 and will distribute the cordage over the pulleys 125, 126, 127 and 128 during the rotation of the turret. As soon as the cordage 30 being fed by the distributor mechanism 48 has been positioned between the clamping members 150 and 151 and 157 and 160, the clamping members will engage and clamp the cordage laid between them by the guide tube 82. The distribution of cordage over the pulleys will continue during the rotation of the turret 42 and will thus distribute the cordage in position to be broken by the mechanism carried by the turret.

Each time the looped conductors 31, 32 and 33, looped out through the braided covering on the cordage 30, engage the switch lever 68, the clamp 85 will be operated to grip the cordage and, if necessary, the pulley 127 will move upwardly slightly, thus to compensate for differences in the spacing between the points where the conductors are thrown out through the braid covered cordage and, in this manner, the looped conductors will be properly positioned to be attached to the pins carried by the plates 179 after the braided covering on the cordage has been broken. After a plate 179, with cordage positioned on it, has travelled approximately 90° around the turret, it will arrive at the station, where the braided covering on the cordage is broken and the plate 179 will be moved downwardly by the coaction of the cam roller 195 with cam track 196 and since, at this position, the clamp members 150 and 157 are in their operated position, the covering on the cordage will be broken and the individual conductors may be positioned on the plate 179, as illustrated in Fig. 12, where the spring-pressed pins 218, 219 and 220 will hold the conductors 31, 32 and 33 in engagement with the pins 214, 215, 216 and 217 and where the conductors will be properly aligned to have terminals attached to them. The continued rotation of the turret 42 will carry the plate 179 into the punch press station of the apparatus where, as described in the detailed description of the various parts, the S-hooks 36, terminals 34 and stay bands 35 will be attached to the cordage and individual conductors and the individual conductors will be sheared against the surfaces of the terminals 34. After the S-hooks, stay bands and terminals are thus attached to the cordage, the plate 179, which had been in the punch press, will be carried out of the punch press to a position where the completed cords may be removed from the pulleys 126, 127 and 128. The punch press having severed the conductors, the cords will hang loosely and will not engage the pulley 125.

It will be understood that when a plate 179 and its carriage frame 190 arrive in the punch press portion of the apparatus, its movement with the turret 42 will be blocked by the blocking lever 261 and the carriage frame 190 will be held in the punch press until the blocking lever 261 is moved out of the path of the carriage frame near the end of the cycle of operation of the punch press. It will also be understood that, as described in detail hereinbefore, the operation of the punch press will be initiated by the abutment member 260 on the carriage frame 190, closing switch 264 to energize the punch press tripping solenoid 266.

What is claimed is:

1. Apparatus for making electrical cords from continuous cordage including a plurality of conductors with a continuous covering thereover and having the conductors thrown through and extending out of the covering at spaced points along the cordage, which comprises a support, means for rotating the support, a plurality of carriers mounted on the support for supporting successive lengths of such cordage with the points where the conductors extend from the covering adjacent to the carriers, means associated with the carriers and support and operative when the carriers reach a predetermined position for successively separating the covering into individual cord lengths at the points where the conductors extend therefrom, thereby locating the uncovered conductors adjacent to each carriage as the support rotates, means associated with each carrier for engaging, separating and positioning the uncovered conductors with respect to each other, means at a fixed station adjacent to the support for cooperating with the carriers to apply metallic members to the cordage and to the conductors so located, and means for coordinating the operations of the metallic member-applying means and the conductor-engaging means with the movement of the support.

2. Apparatus for making electrical cords from continuous cordage including a plurality of conductors with a continuous covering thereover and having the conductors thrown through and extending out of the covering at spaced points along the cordage, which comprises a support, means for rotating the support, a plurality of carriers movably mounted on the support, guide means on the support and carriers over which successive lengths of such cordage may be passed to position the cordage in a predetermined pattern with the points where the conductors extend from the covering adjacent to the carriers, means operative when the carriers reach a predetermined position for successively separating the covering into individual cord lengths at the points where the conductors extend therefrom, means for temporarily holding the carriers stationary while the support moves, means at a fixed station adjacent to the support and cooperating with the stationary carriers for applying metallic members to the cordage and for applying terminals to the uncovered conductors and cutting them, and means for coordinating the operation of the last-mentioned means with the movement of the support.

3. An apparatus for forming connected individual electrical cords from continuous conductor covered cordage which has its conductors thrown through and out of the covering at spaced points along the cordage, the covering being continuous at such points, comprising means for gripping the cordage at opposite sides of one of said points, and means intermediate thereof for applying tension to the cordage to pull apart the covering at said point where the conductors extend outwardly, thereby separating the covering into individual cord lengths.

4. Apparatus for severing the covering between individual electrical cords in continuous cordage including a plurality of conductors with a continuous covering thereover and having the conductors thrown through and extending out of the covering at spaced points along the cordage, which comprises a cordage-supporting carrier for supporting successive lengths of such cordage, means for successively gripping the cordage at opposite sides of the points where the conductors extend outwardly, and means for successively applying tension to those portions of the cordage intermediate the gripping means after the gripping means have gripped the cordage to pull apart the covering at said points.

5. Apparatus for severing the covering between individual electrical cords in continuous cordage including a plurality of conductors with a continuous covering thereover and having the conductors thrown through and extending out of the covering at spaced points along the cordage, which comprises a support, a plate movably mounted on the support, a pair of clamps mounted on the support adjacent to said plate, a cordage-engaging member carried by the plate, the clamps and the cordage-engaging member being so arranged that the cordage may be passed thereover with the cordage passing through one of the clamps, over the cordage-engaging member and through the other clamp, means for closing the clamps, and means for moving the plate with respect to the clamps after said clamps have been closed, whereby the cordage-engaging member applies tension to that portion of the cordage held between the clamps and breaks the covering thereon.

6. Apparatus for severing the covering between individual electrical cords in continuous conductor covered cordage having conductors extending through the covering at intervals along the cordage, which comprises a support, a plate movably mounted on the support, a pair of clamps mounted on the support, each clamp being adjacent to and on opposite sides of said plate, a plurality of pulleys mounted on the support, a pulley mounted on the plate, the pulleys on the support and on the plate being so arranged that the cordage may be festooned thereover with the cordage passing over a pulley on the support, through one of the clamps, over the plate pulley, through the other clamp and over another pulley on the support, means for closing each clamp at predetermined intervals, and means for moving the plate with respect to the clamps after said clamps have been closed, whereby the pulley carried by the plate applies tension to those portions of the cordage held between the clamps and breaks the covering thereon.

7. Apparatus for severing the covering between individual electrical cords in continuous conductor covered cordage having conductors extending through the covering at intervals, which comprises a turret, means for rotating the turret, a plurality of plates movably mounted on the turret, a plurality of pairs of clamps mounted on the turret, each pair of clamps being adjacent to a plate, a plurality of pulleys mounted on the turret, a pulley mounted on each plate, means for festooning the cordage over the pulleys on the turret and plates with the cordage adjacent to each plate passing through a clamp, over the plate pulley and through another clamp and with the portions of the conductors extending from the covering located at the plates, means for closing each pair of clamps at predetermined intervals, and means for moving each plate with respect to the clamps associated therewith after said clamps have been closed, whereby the pulleys carried by the plates successively apply tension to those portions of the cordage held between the clamps and break the covering thereon at the points where the conductors extend therefrom.

8. Apparatus for forming connected individual electrical cords from continuous cordage including a plurality of conductors with a continuous covering thereover and having the conductors thrown through and extending out of the covering at spaced points along the cordage, which comprises a turret, means for rotating the turret, a plurality of plates movably mounted on the turret, a plurality of pairs of clamps mounted on the turret, each pair of clamps being adjacent to a plate, a plurality of pulleys mounted on the turret, a pulley mounted on each plate, means at a fixed station movable to positions adjacent to the pulleys as they are advanced past said station for feeding and successively laying the cordage over each pulley, means for coordinating the movement of said last-named means with the movement of the turret, means for closing each pair of clamps at predetermined intervals, and means for moving each plate with respect to the clamps associated therewith after said clamps have been closed, whereby the pulleys carried by the plates successively apply tension to those portions of the cordage held between the clamps and break the covering thereon at the points where the conductors extend therefrom.

9. Apparatus for forming connected individual electrical cords from continuous cordage including a plurality of conductors with a continuous covering thereover and having the conductors thrown through and extending out of the covering at spaced points along the cordage, which comprises a turret, means for rotating the turret, a plurality of plates movably mounted on the turret, a plurality of pairs of clamps mounted on the turret, each pair of clamps being adjacent to a plate, a plurality of pulleys mounted on the turret, a pulley mounted on each plate, the clamps and the several pulleys being so arranged that the cordage may be festooned thereover with the cordage adjacent to each plate passing over a pulley on the turret, through one of the adjacent clamps, over the plate pulley, through the other adjacent clamp and through another pulley on the turret and with each point where the conductors extend from the covering adjacent to a plate, means for closing each pair of clamps at predetermined intervals, and means for moving each plate with respect to the clamps associated therewith after said clamps have been closed, whereby the pulleys carried by the plates successively apply tension to those portions of the cordage held between the clamps and break the covering thereon at the points where the conductors extend therefrom.

10. Apparatus for forming electrical cords from continuous cordage including a plurality of conductors with a continuous covering thereover and having the conductors thrown through and extending out of the covering at spaced points along the cordage, which comprises a turret, means for rotating the turret, a plurality of plates movably mounted on the turret, a plurality of pairs of clamps mounted on the turret, each pair of clamps being adjacent to a plate, a cordage-engaging member mounted on each plate, the clamps and cordage-engaging members being so arranged that the cordage adjacent to each plate may be passed through one of the adjacent clamps, over the cordage-engaging member on the plate and over the other adjacent clamp with one of the points along the cordage where the conductors extend out of the covering adjacent to the plate, means for closing each pair of clamps at predetermined intervals, means for moving each plate with respect to the clamps associated therewith after the clamps have been closed, whereby the cordage-engaging members carried by the plate successively apply tension to those portions of the cordage held between the clamps, thereby breaking the covering into individual cord lengths and locating the uncovered conductors adjacent to each plate as the turret rotates, means at a fixed station adjacent to said turret for cooperating with each plate for applying terminals to the conductors so located, and means for coordinating the movements of said terminal-applying means and said turret.

11. Apparatus for forming electrical cords from continuous cordage including a plurality of conductors with a continuous covering thereover and having the conductors thrown through and extending out of the covering at spaced points along the cordage, which comprises a turret, means for rotating the turret, a plurality of plates movably mounted on the turret, a plurality of pairs of clamps mounted on the turret, each pair of clamps being adjacent to a plate, a cordage-engaging member mounted on each plate, the clamps and cordage-engaging members being so arranged that the cordage adjacent to each plate may be passed through one of the adjacent clamps, over the cordage-engaging member on the plate and over the other adjacent clamp with one of the points along the cordage where the conductors extend out of the covering adjacent to the plate, means for closing each pair of clamps at predetermined intervals, means for moving each plate with respect to the clamps associated therewith after the clamps have been closed, whereby the cordage-engaging member carried by the plates successively apply tension to those portions of the cordage held between the clamps, thereby breaking the covering into individual cord lengths and locating the uncovered conductors adjacent to each plate as the turret rotates, means on each said plate for engaging, separating and positioning the uncovered conductors with respect to each other, means at a station adjacent to said turret for cooperating with each plate for applying terminals to the conductors so located, and means for coordinating the movements of said terminal-applying means, said conductor-engaging means and said turret.

12. Apparatus for forming electrical cords from continuous cordage including a plurality of conductors with a continuous covering thereover and having the conductors thrown through and extending out of the covering at spaced points along the cordage, which comprises a turret, means for rotating the turret, a plurality of plates movably mounted on the turret, a plurality of pairs of clamps mounted on the turret, each pair of clamps being adjacent to a plate, a plurality of pulleys mounted on the turret, a pulley mounted on each plate, means for festooning the cordage over the pulleys on the turret and plates with the cordage adjacent to each plate passing through a clamp, over a plate pulley and through another clamp and with the portions of the conductors extending from the covering located at the plates, means for closing each pair of clamps at predetermined intervals, means for moving each plate with respect to the clamps associated therewith after said clamps have been closed, whereby the pulleys carried by the plates successively apply tension to those portions of the cordage held between the clamps and break the covering thereon at the point where the conductors extend therefrom, means for temporarily holding the plates stationary while the turret moves, means cooperating with the plates while they are stationary for applying terminals to the uncovered conductors and cutting them, and means for coordinating the movements of said terminal-applying means and said turret.

13. Apparatus for forming electrical connecting cords from covered cordage which has conductors thrown out through its covering at intervals, which comprises a rotatable turret, means for rotating the turret, a plurality of plates movably mounted on the turret for supporting successive lengths of the cordage, a plurality of cooperating means on the plates and turret for engaging the cordage, means at a fixed station movable to positions adjacent to the cordage-engaging means as they are carried past said station for feeding and successively laying the cordage over each cordage-engaging means, means for coordinating the operation of the cordage-feeding means with the movement of the turret so that the cordage-feeding means places the points along the cordage where the conductors extend from the covering adjacent to the plates with each of said points intermediate a cordage-engaging means on the turret and a cordage-engaging means on a plate, means for moving the plates with respect to said turret to apply tension to those portions of the cordage between the cordage-engaging means and thereby break the covering on the cordage at said points, means for temporarily holding the successive plates stationary while the turret moves, means at a fixed station adjacent to the turret for cooperating with the stationary plates for applying terminals to the uncovered conductors and cutting them, and means for coordinating the operation of the last-mentioned means with the movement of the turret.

14. Apparatus for forming connected individual electrical cords from continuous cordage including a plurality of conductors with a continuous covering thereover and having the conductors thrown through and extending out of the covering at spaced points along the cordage, which comprises a support for supporting successive lengths of such cordage, a plurality of sets of gripping means on the support, each set of gripping means being positioned to grip the cordage at opposite sides of one of the points where the conductors extend out of the covering, and means adjacent to each set of gripping means and intermediate thereof for applying tension to the cordage to pull apart the covering at one of said points.

15. Apparatus for forming connected individual electrical cords from continuous cordage including a plurality of conductors with a continuous covering thereover and having the conductors thrown through and extending out of the covering at spaced points along the cordage, which comprises a support for supporting successive lengths of such cordage, means for moving the support, a plurality of sets of gripping means on the support, each set of gripping means being positioned to grip the cordage at opposite sides of one of the points where the conductors extend out of the covering, means adjacent to each set of gripping means and intermediate thereof for applying tension to the cordage to pull apart the covering at one of said points, means at a fixed position adjacent to the support for feeding and successively laying the cordage over the gripping means and the tension-applying means, and means for coordinating the operation of the last-named means with the movement of the support.

16. Apparatus for forming individual electrical cords from continuous cordage including a plurality of conductors with a continuous covering thereover and having the conductors thrown through and extending out of the covering at spaced points along the cordage, which comprises a support for supporting successive lengths of such cordage, means for moving the support, a plurality of sets of gripping means on the support, each set of gripping means being positioned to grip the cordage at opposite sides of one of the points where the conductors extend out of the covering, means adjacent to each set of gripping means and intermediate thereof for applying tension to the cordage to pull apart the covering at one of said points, means at a station adjacent to the support for applying metallic members to the predetermined parts of said cordage after the covering has been pulled apart, and means for coordinating the operation of said member-applying means with the movement of the support.

17. Apparatus for forming individual electrical cords from continuous cordage including a plurality of conductors with a continuous covering thereover and having the conductors thrown through and extending out of the covering at spaced points along the cordage, which comprises a support for supporting successive lengths of such cordage, means for moving the support, a plurality of sets of gripping means on the support, each set of gripping means being positioned to grip the cordage at opposite sides of one of the points where the conductors extend out of the covering, means adjacent to each set of gripping means and intermediate thereof for applying tension to the cordage to pull apart the covering at one of said points, means at a fixed position adjacent to the support for feeding and successively laying the cordage over the gripping means and the tension-applying means, means at a station adjacent to the support for applying metallic members to the predetermined parts of said cordage after the covering has been pulled apart, and means for coordinating the operations of the cordage-feeding means and the member-applying means with the movement of the support.

ROBERT T. ADAMS.

REFERENCES CITED

The following references are of record in the file of this patent:

UNITED STATES PATENTS

| Number | Name | Date |
| --- | --- | --- |
| 1,765,521 | Barrans | June 24, 1930 |
| 1,953,476 | Gilbert | Apr. 3, 1934 |
| 1,547,504 | Le Boeuf | July 28, 1925 |
| 2,357,902 | Malhiot | Sept. 12, 1944 |
| 1,836,500 | Poole | Dec. 15, 1931 |

FOREIGN PATENTS

| Number | Country | Date |
| --- | --- | --- |
| 56,092 | Sweden | Feb. 26, 1924 |
| 728,737 | France | Apr. 18, 1932 |